Aug. 16, 1932.  R. S. PLEXICO  1,872,338
TRANSMISSION GEARING
Filed Nov. 18, 1926

INVENTOR.
Robert S. Plexico,
BY
Hood + Hahn.
ATTORNEYS

Patented Aug. 16, 1932

1,872,338

UNITED STATES PATENT OFFICE

ROBERT S. PLEXICO, OF MUNCIE, INDIANA

TRANSMISSION GEARING

Application filed November 18, 1926. Serial No. 149,045.

My invention relates to improvements in transmission gearing and particularly to transmission gearing for automobiles and the like.

It is one of the objects of my invention to provide an improvement in epicycloidal transmission gearing for automobiles and particularly that type of transmission wherein epicycloidal gears are used for one of the speed changes.

For the purpose of disclosing my invention I have illustrated an embodiment thereof in the accompanying drawing in which—

Figure 1:
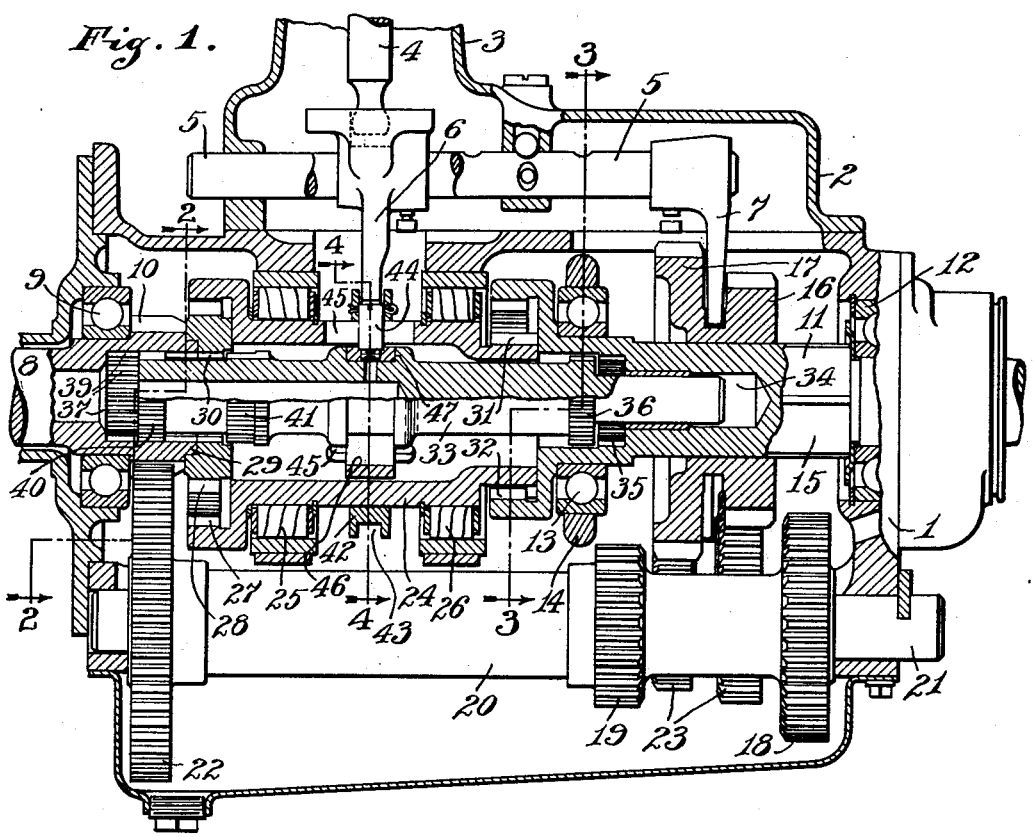
Fig. 1 is a longitudinal section of an automobile transmission embodying my invention.
Figure 2:
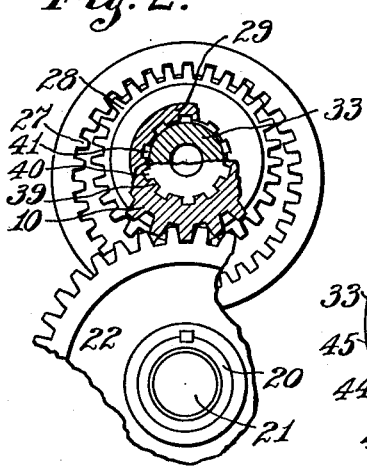
Fig. 2 is a sectional view on the line 2—2 of Fig. 1.
Figure 4:
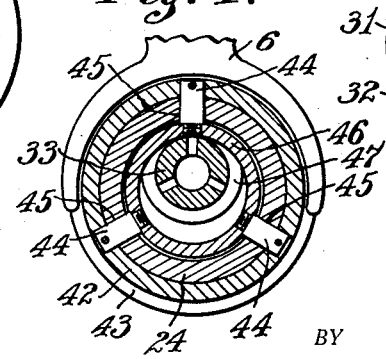
Fig. 4 is a sectional view on the line 4—4 of Fig. 1.
Figure 3:
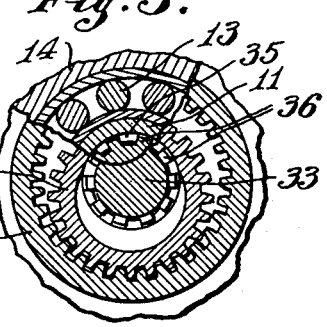
Fig. 3 is a sectional view on the line 3—3 of Fig. 1.

In the embodiment illustrated I provide a transmission casing 1 which may be of any suitable type having a top 2 provided with a cone support 3 in which is mounted, for universal movement, a shifting lever 4 adapted to operate sliding rods 5, 5 provided with the usual shifting forks 6 and 7.

The driving shaft 8, which is adapted to be connected with the engine or power unit through the usual clutch connection, extends into the casing and has one end journaled in suitable ball bearings 9 mounted in the front wall of the casing. This driving shaft 8 is provided at its inner end and within the casing with a driving gear 10. The driven shaft 11 also extends into the casing, being supported in a ball bearing 12 in the end wall of the casing, and at its forward end by a ball bearing 13 mounted in a bridge member 14 extending from the inner wall of the casing. That portion of the shaft extending into the casing is squared as at 15 and has slidably mounted thereon a pair of speed changing gears 16 and 17 which, due to the square on the shaft are rotatable with the shaft. These speed changing gears 16 and 17 are adapted to be slid into meshing engagement respectively with speed changing gears 18 and 19 rotatable with a sleeve 20 surrounding a shaft 21. The opposite end of this sleeve is provided with a gear 22 meshing with the gear 10. The gears 16, 17 and 18, 19 constitute the first and second speed changing gears of the transmission. There is also provided suitable reversing gears 23, the structure of which need not be described in detail as these are of the usual reversing gear construction of the commercial type of automobile transmission.

A hub 24 is arranged between the ends of the two shafts 8 and 11 being rotatably supported in a pair of spaced roller bearings 25 and 26, supported by the walls of the casing and this hub is adapted to rotate on an axis eccentric to the axis of rotation of the shafts 8 and 11. The forward end of this hub is provided with an internal gear 27 meshing with a gear 28 rotatably mounted on an extension 29 of the shaft 8, which extension projects beyond the gear 10. It will be noted that the bearing support, formed by the extension 29 is considerably less in width than the width of the gear so that the inner periphery of the gear may be provided with teeth 30, the purpose of which will appear more fully hereinafter. The opposite end of the hub is provided with an external gear 31 adapted to mesh with an internal gear 32 on the end of the shaft 11 and formed integrally therewith. The arrangement is such that the bearings 26 and 13 are arranged on opposite sides of the gear 32 and closely adjacent thereto and the bearing 25 is closely adjacent to the gear 27 so that these gears will be rigidly supported and held against any deflecting tendency.

Extending between the two shafts 8 and 11 is a clutch shaft 33 which is longitudinally movable relatively to the two shafts. One end of the clutch shaft is reduced and has a bearing in the recess 34 in the shaft 11, which shaft towards its extremity, and at a point approximately below the bearing 13 is widened and provided with internal teeth 35 and the shaft 33 is provided with external teeth 36 adapted, when the shaft is moved laterally in one direction to mesh with the teeth 35.

The opposite end of the shaft 33 projects within a recess 37 in the end of the shaft 8, which recess is provided with internal teeth 39. The shaft 33 is provided with two sets of 40 and 41 of external teeth, which sets are spaced apart and are adapted to mesh respectively, under predetermined conditions, with the teeth 39 of the shaft 8 and with the teeth 30 of the gear 28.

Longitudinal movement is imparted to the shaft 33 by the sliding fork 6 and to this end I provide a ring 42 surrounding the hub 24 and provided with an annular groove 43 into which the fork 6 takes. This ring is operably connected to a series of radially extending pins 44. These pins radially project through longitudinally extending slots 45 in the hub 24, from a ring 46 operating in a groove 47 in the shaft 33 and concentrically mounted with respect to the hub 24.

In operation, with the parts in the position illustrated in Fig. 1, the transmission is in neutral and no movement is transmitted from the shaft 8 to the shaft 11. By moving the gear 17 into mesh with the gear 19 power will be transmitted from the shaft 8 to the shaft 11 through the gears 10 and 22 and the gears 19 and 17 at low speed. If the gear 16 is moved into mesh with the gear 18 the power will be transmitted to the shaft 11 at a higher or second speed.

When the shaft 33 is moved forward to cause the clutch teeth 41 to move into clutching engagement with the teeth 30 on the gear 28 the gear 28 will be drivingly connected with the shaft 8, due to the fact that the teeth 40 are in engagement with the teeth 39. The gear 28 will thus be rotated and power will be transmitted to the shaft 11 from the gear 28 through the internal gear 27, the hub 24 and by the external gear 31 and internal gear 32 to the shaft 11, and the shaft 11 will be driven at its third speed. If the shaft 33 be shifted in the opposite direction until the clutch teeth 36 engage the clutch teeth 35 the teeth 41 will be moved out of engagement with the teeth 30 so that the gear 28 will be disconnected from the shaft 8 and due to the fact that teeth 39 are still in engagement with teeth 40 and teeth 36 are in engagement with teeth 35 the two shafts 8 and 11 will be directly connected through the shaft 33 thereby driving shaft 11 at the same speed as that of shaft 8.

I claim:

1. In combination, a driving and a driven shaft co-axially mounted, an external gear on one of said shafts, an internal gear on the other shaft, a hollow eccentrically mounted gear member for connecting said external and internal gears disposed between said gears and having sets of external and internal teeth in mesh with the internal and external gears respectively, the gear on the driving shaft being normally drivingly disconnected therefrom, means for drivingly connecting said gear to said shaft, a pair of spaced apart stationary bearings for said hollow gear member arranged adjacent the gears thereon and a stationary bearing for said driven shaft arranged adjacent the gear thereon and on the opposite side of said gear to one of said first mentioned bearings.

2. In combination a driving and a driven shaft, co-axially mounted, and having their ends spaced apart, an external gear on one of said shafts, an internal gear on the other shaft, a hollow eccentrically mounted member disposed between the ends of said shafts and having sets of external and internal teeth in mesh with the internal and external gears respectively, the gear on the driving shaft being drivingly idle, a longitudinally shiftable member disposed between the ends of said co-axial shafts and drivingly connected with the driving shaft, a clutch member on said idle gear and a clutch member on said longitudinally shiftable member arranged to engage the clutch member of said gear to drivingly connect the gear with said shaft, clutch members on the driven shaft and clutch members on said shiftable member arranged to be moved by the shifting of said member into engagement with the clutch members on the driven shaft to drivingly connect the driven shaft with the driving shaft through said longitudinally shiftable member.

3. In combination a driving and driven shaft co-axially mounted, an external gear on one of said shafts and an internal gear on the other of said shafts, the gear on the driving shaft being drivingly idle with respect thereto, a hollow eccentrically mounted gear member interposed between the ends of said shafts and having sets of external and internal teeth in mesh with the external and internal gears, a longitudinally shiftable member mounted within said hollow member and interposed between the ends of said shafts and drivingly connected with the driving shaft, said idle gear and shiftable member having interlocking clutch members moved into interlocking position by the longitudinal shifting of the member to connect said idle gear with the driving shaft and said driven shaft, and said longitudinally shiftable member having interlocking clutch members moved into interlocking engagement by the longitudinal movement of said member to directly connect said driven shaft to the driving shaft.

4. In combination, a driving shaft and a driven shaft co-axially mounted, an external gear on one of said shafts and an internal gear on the other shaft, the gear on said driving shaft being drivingly idle relatively thereto, a longitudinally shiftable member interposed between the ends of said shafts and drivingly connected with the driving shaft, interlocking clutch members on the idle gear and shiftable member moved into interlocking engagement by the longitudinal shifting of said member to connect the idle gear with said driving shaft, interlocking clutch members on said driven shaft and shiftable member moved into interlocking engagement by the shifting of said shiftable member to connect the driven shaft to the driving shaft and a hollow eccentrically mounted gear member in surrounding relation to said shiftable member and having sets of external and internal teeth in mesh with the internal and external gears on said shafts.

5. In combination, a driving and a driven shaft co-axially mounted and having their ends recessed, internal teeth formed in the recessed end of the driving shaft, internal teeth formed in the end of the driven shaft, a bearing for each of said shafts adjacent said teeth, a longitudinally shiftable member interposed between the ends of said shafts having teeth meshing with the internal teeth of the driving shaft and teeth adapted to move into engagement with the teeth of the driven shaft by the longitudinal movement of said member, and external gear on one of said shafts and an internal gear on the other of said shafts, the gear on said driven shaft being adjacent the bearing therefor, and a hollow eccentrically mounted member having external and internal teeth respectively meshing with the internal and external teeth of the shafts and a pair of spaced apart bearings for said member arranged adjacent the respective sets of teeth.

6. In combination, a driving shaft and a driven shaft co-axially mounted, an external gear on one of said shafts and an internal gear on the other of said shafts, the gear mounted on the driving shaft being drivingly idle relatively thereto, a longitudinally slidable clutch member interposed between the ends of said shafts and arranged when in one position to drivingly connect the driving shaft with the driven shaft and a hollow eccentrically mounted gear member surrounding said clutch member and having sets of external and internal teeth in mesh with the internal and external gears respectively.

In witness whereof, I ROBERT S. PLEXICO have hereunto set my hand at Muncie, Indiana, this 13th day of November, A. D. one thousand nine hundred and twenty-six.

ROBERT S. PLEXICO.